United States Patent
Hashimoto et al.

(10) Patent No.: US 8,367,155 B2
(45) Date of Patent: Feb. 5, 2013

(54) MANUFACTURING METHOD OF MAGNETIC RECORDING MEDIUM AND MAGNETIC RECORDING/REPRODUCING APPARATUS

(75) Inventors: Atsushi Hashimoto, Chiba (JP); Yuzo Sasaki, Ichihara (JP); Gohei Kurokawa, Ichihara (JP)

(73) Assignee: Showa Denko K.K., Tokyo (JP)

( * ) Notice: Subject to any disclaimer, the term of this patent is extended or adjusted under 35 U.S.C. 154(b) by 449 days.

(21) Appl. No.: 12/693,779

(22) Filed: Jan. 26, 2010

(65) Prior Publication Data
US 2010/0195246 A1 Aug. 5, 2010

(30) Foreign Application Priority Data
Feb. 2, 2009 (JP) ................. 2009-021943

(51) Int. Cl.
*G11B 5/127* (2006.01)
(52) U.S. Cl. ....................................................... 427/129
(58) Field of Classification Search .................. 427/129, 427/130, 131, 132
See application file for complete search history.

(56) References Cited

U.S. PATENT DOCUMENTS

| | | | | |
|---|---|---|---|---|
| 5,759,681 | A * | 6/1998 | Hosoe et al. | 428/332 |
| 6,316,097 | B1 * | 11/2001 | Liu et al. | 428/332 |
| 7,081,309 | B2 | 7/2006 | Do et al. | |
| 7,470,474 | B2 | 12/2008 | Sakawaki et al. | |
| 2002/0078550 | A1 * | 6/2002 | Shimazawa et al. | 29/603.07 |
| 2004/0121190 | A1 * | 6/2004 | Onuma et al. | 428/694 TS |
| 2004/0224185 | A1 * | 11/2004 | Nakamura et al. | 428/694 TS |
| 2005/0227120 | A1 * | 10/2005 | Ichihara et al. | 428/830 |
| 2009/0141399 | A1 | 6/2009 | Sakawaki et al. | |

FOREIGN PATENT DOCUMENTS

| | | |
|---|---|---|
| JP | 2004-310910 A | 11/2004 |
| JP | 2005-276410 A | 10/2005 |
| JP | 2007-272990 A | 10/2007 |

\* cited by examiner

*Primary Examiner* — Michael Cleveland
*Assistant Examiner* — Tabassom Tadayyon Eslami
(74) *Attorney, Agent, or Firm* — Sughrue Mion, PLLC (57) ABSTRACT

There is provided a manufacturing method of a magnetic recording medium that maintains a high level of perpendicular orientation of a perpendicular magnetic layer and enables to further increase high recording density, prepared such that at least on a non-magnetic substrate, there are laminated a soft magnetic base layer, an orientation control layer 11 that controls the orientation of the layer immediately thereabove, and a perpendicular magnetic layer with a magnetization easy axis thereof primarily oriented perpendicular to the non-magnetic substrate. The manufacturing method is characterized in that when configuring the perpendicular magnetic layer with two or more magnetic layers 12 to 14 and crystal-growing each layer so that the crystal grains that constitute the respective magnetic layers 12 to 14, together with the crystal grains that constitute the orientation control layer 11, form column-shaped crystals S1 to S3 in a consecutive manner in the thickness direction, lamination of the orientation control layer 11 is performed while the substrate is being cooled or immediately after the substrate has been cooled.

7 Claims, 5 Drawing Sheets

MANUFACTURING METHOD OF MAGNETIC RECORDING MEDIUM AND MAGNETIC RECORDING/REPRODUCING APPARATUS

TECHNICAL FIELD

The present invention relates to a manufacturing method of a magnetic recording medium, and a magnetic recording/reproducing apparatus.

Priority is claimed on Japanese Patent Application No. 2009-021943, filed Feb. 2, 2009, the contents of which are incorporated herein by reference.

BACKGROUND ART

The recording density of a hard disk drive (HDD), which is a type of magnetic recording/reproducing apparatus, is increasing at an annual rate of 50% or higher, and this increasing trend is expected to continue. In response to this, magnetic heads and magnetic recording media that are suitable for high recording density are being developed.

A magnetic recording medium equipped in a magnetic recording/reproducing apparatus currently available on the market is a so-called perpendicular magnetic recording medium in which the magnetization easy axis in the magnetic film is primarily oriented perpendicular. In a perpendicular magnetic recording medium, even when its recording density is highly increased, diamagnetic field influence in a boundary region between recording bits is small and clear bit boundaries are formed, and therefore, an increase in noise can be suppressed. In addition, it has a small decrease in recording bit volumes when highly increasing recording density, and consequently is resistant to thermal fluctuation effects. For this reason, perpendicular magnetic recording media are receiving broad attention in recent years, and there has been proposed a structure of a medium that is suitable for perpendicular magnetic recording.

Moreover, in order to respond to the demand for further increasing the recording density of a magnetic recording medium, use of a single magnetic pole head, which has a superior ability to write into a perpendicular magnetic layer, is being considered. In order to adapt to such a single magnetic pole head, there has been proposed a magnetic recording medium that improves incoming/outgoing efficiency of magnetic flux between a single magnetic pole head and a magnetic recording medium by providing a layer called a backing layer composed of a soft magnetic material between a perpendicular magnetic layer that serves as a recording layer and a non-magnetic substrate.

However, in a magnetic recording/reproducing apparatus that uses the above-mentioned magnetic recording medium simply having a backing layer provided therein, recording/reproducing characteristics when recording and reproducing, resistance to thermal fluctuations, and recording resolution are not satisfactory, and consequently there has been a demand for a magnetic recording medium that excels in these characteristics.

In order to further increase recording density in the future, it is essential to: achieve high S/N ratio, which is a ratio of signal to noise (S/N ratio) in reproduction and is particularly important as a recording/reproducing characteristic; and improve thermal fluctuation resistance. However, these two items are in a conflicting relationship, in which if one of them is improved, then the other one will be insufficient, and therefore, achieving both of them at a high level is a significant problem.

In order to solve such a problem, there has been proposed a magnetic recording medium that is characterized in that three magnetic layers are AFC (anti-ferromagnetic coupling) bonded using a non-magnetic layer and the like, and thereby advantage of the reduction in composite Mrt and PW50 is taken without causing a reduction in S/N ratio (for example, refer to Patent Document 1).

Specifically, this Patent Document 1 discloses a magnetic recording medium that is characterized in that it has: a substrate; a first lower ferromagnetic layer that is provided on the substrate and has a residual magnetization Mr, a thickness t, and a product Mrt of residual magnetization times thickness; a ferromagnetic bonding layer that is provided on the first lower ferromagnetic layer; a second lower ferromagnetic layer that is provided on the ferromagnetic bonding layer and has an Mrt value; an anti-ferromagnetic bonding layer that is provided on the second lower ferromagnetic layer; and an upper ferromagnetic layer that is provided on the anti-ferromagnetic bonding layer and has an Mrt value greater than that of the total Mrt value of the first and second lower ferromagnetic layers.

Meanwhile, in order to improve the recording/reproducing characteristic and thermal fluctuation characteristic of a perpendicular magnetic recording medium, there has been proposed to use an orientation control layer and form multiple magnetic layers so as to prepare crystal grains of each magnetic layer into consecutive column-shaped crystals, thereby enhancing the perpendicular orientation of the magnetic layers (for example, refer to Patent Document 2).

Moreover, for example, use of Ru as the orientation control layer has been disclosed. The apex section of a column-shaped crystal of Ru has a dome-shaped convex section, and therefore Ru has an effect such that crystal grains of a magnetic layer and the like are grown on this convex section, isolated structure of the grown crystal grains is promoted, the crystal grains are isolated, and magnetic grains are grown into a column shape (for example, refer to Patent Document 3).

PRIOR ART DOCUMENTS

[Patent Documents]

[Patent Document 1] Japanese Unexamined Patent Application, First Publication No. 2005-276410

[Patent Document 2] Japanese Unexamined Patent Application, First Publication No. 2004-310910

[Patent Document 3] Japanese Unexamined Patent Application, First Publication No. 2007-272990

SUMMARY OF THE INVENTION

Problems to be Solved by the Invention

Incidentally, there continues to be a demand for increasing the recording density of a magnetic recording medium, and accordingly, an ever higher level of characteristic improvement is required in a magnetic recording medium. Specifically, in order to increase the recording density of a magnetic recording medium, the crystals that constitute the above-mentioned orientation control layer need to be made minute, and the magnetic grains in a column structure formed thereon need to be made minute. At the same time, in order to maintain the high level of reliability of the magnetic recording medium, the flatness of the medium surface needs to be enhanced and the scratch resistance of the surface thereof also needs to be improved.

The present invention takes into consideration such conventional circumstances, with an object of providing a manufacturing method of a magnetic recording medium that maintains a high level of the perpendicular orientation of a perpendicular magnetic layer and that enables a further increase in high recording density, and a magnetic recording/reproducing apparatus provided with a magnetic recording medium that is manufactured with use of such manufacturing method.

Means for Solving the Problem

The present invention provides the following measures. (1) A manufacturing method of a magnetic recording medium prepared such that at least on a non-magnetic substrate, there are laminated a soft magnetic base layer, an orientation control layer that controls the orientation of the layer immediately thereabove, and a perpendicular magnetic layer with the magnetization easy axis thereof primarily orientated perpendicular to the non-magnetic substrate, wherein when configuring the perpendicular magnetic layer with two or more magnetic layers, and crystal-growing each layer so that the crystal grains that constitute each of the magnetic layers, together with the crystal grains that constitute the orientation control layer, form column-shaped crystals in a consecutive manner in a thickness direction, lamination of the orientation control layer is conducted while the substrate is being cooled or immediately after the substrate has been cooled. (2) A manufacturing method of a magnetic recording medium according to (1), wherein a non-magnetic layer is arranged between the orientation control layer and the perpendicular magnetic layer, or having configured the perpendicular magnetic layer with two or more magnetic layers, a non-magnetic layer is arranged between these magnetic layers, and each layer is crystal-grown so that crystal grains that constitute the magnetic layer and the non-magnetic layer, together with crystal grains that constitute the orientation control layer, form column-shaped crystals in a consecutive manner in the thickness direction, and lamination of the orientation control layer is conducted while the substrate is being cooled or immediately after the substrate has been cooled. (3) A manufacturing method of a magnetic recording medium according to either one of (1) and (2), wherein the non-magnetic substrate is fixed on a cooled holder to perform cooling of the non-magnetic substrate. (4) A manufacturing method of a magnetic recording medium according to (3), wherein lamination of the orientation control layer is conducted in a state where an opening section provided in a central section of the non-magnetic substrate is fixed on the holder. (5) A manufacturing method of a magnetic recording medium according to any one of (1) to (4), wherein on a convexo-concave surface where an apex section of each of column-shaped crystals that constitute the orientation control layer is of a convex shape, a height from a top-most apex section of each of the column-shaped crystals to a level where a clearance with an adjacent column-shaped crystal is none, is not greater than an outer-most diameter of each of the column-shaped crystals. (6) A manufacturing method of a magnetic recording medium according to any one of (1) to (5), wherein a grain diameter of the crystal grains that constitute the orientation control layer is not greater than 5 nm. (7) A manufacturing method of a magnetic recording medium according to any one of (1) to (6), wherein the orientation control layer includes an Ru layer or a layer having Ru serving as its primary component. (8) A manufacturing method of a magnetic recording medium according to any one of (1) to (7), wherein the magnetic layer or the non-magnetic layer has a granular structure. (9) A magnetic recording/reproducing apparatus provided with a magnetic recording medium that is manufactured by the manufacturing method according to any one of (1) to (8), and a magnetic head that records and reproduces information on and from the magnetic recording medium.

EFFECT OF THE INVENTION

As has been described above, according to the present invention, it is possible to grow minute column-shaped crystals in a consecutive manner in the thickness direction from the orientation control layer to reach the top-most layer of the perpendicular magnetic layer. Moreover, it is possible, by smoothing the apex section of each of the column-shaped crystals that constitute the orientation control layer, to increase the level of flatness of the surface of the magnetic recording medium, while improving the scratch resistance of the surface of the magnetic recording medium. Consequently, according to the present invention, it is possible to provide a magnetic recording medium that maintains a high level of the perpendicular orientation of the perpendicular magnetic layer and that enables further increase in high recording density, and a magnetic recording/reproducing apparatus that is provided with such a magnetic recording medium.

BEST MODE FOR CARRYING OUT THE INVENTION

Hereunder, there are described in detail, with reference to the accompanying drawings, a manufacturing method of a magnetic recording medium and a magnetic recording/reproducing apparatus to which the present invention is applied. In the drawings used in the following description, characterizing portions may be shown conveniently in an enlarged manner in some cases in order to facilitate understanding of the characteristics thereof, and the dimensional proportion of each constituent may not be the same as that employed in reality.

The present inventors conducted an intensive investigation in order to solve the above problems, and discovered that in order to enhance the perpendicular orientation of multi-layered magnetic layers and make magnetic grains minute, crystal grains that constitute an orientation control layer need to be made minute.

Figure 1:
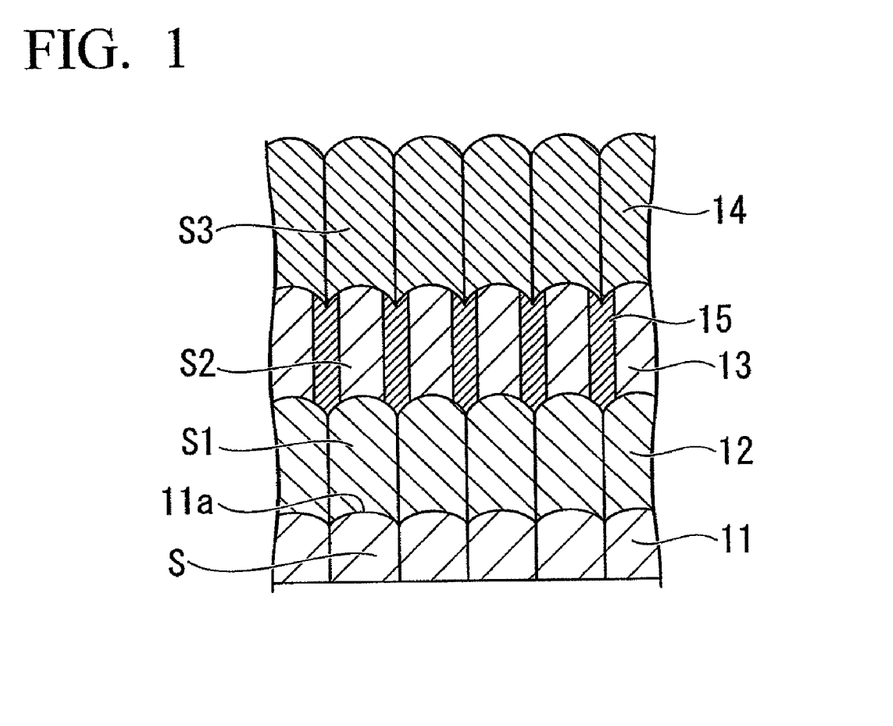
FIG. 1 is a cross-sectional view showing a state where column-shaped crystals of respective layers have been grown perpendicular to a substrate surface.

That is to say, as shown in FIG. 1, in an orientation control layer 11, there is formed a convexo-concave surface 11a in which the apex section of each column-shaped crystal S constituting this orientation control layer 11 is of a dome-shaped convex, and crystal grains of a magnetic layer (or a non-magnetic layer) 12 are grown from this convexo-concave surface in a thickness direction into column-shaped crystals S1. Moreover, crystal grains of a non-magnetic layer (or a magnetic layer) 13 and a top-most magnetic layer 14 formed on these column-shaped crystals S1, are also grown epitaxially into column-shaped crystals S2 and S3 that continue from the column-shaped crystals S1.

Thus, in a case where the magnetic layers 12 to 14 are multiple-layered, then for the crystal grains that constitute these respective layers 12 to 14 epitaxial growth is repeated to give column-shaped crystals S1 to S3 in a consecutive manner from the orientation control layer 11 to reach the top-most magnetic layer 14. The layer 13 shown in FIG. 1 is a layer having a granular structure, and surrounding the column-shaped crystal S2 that constitutes this layer 13, there is formed an oxide 15.

Consequently, if the crystal grains of the orientation control layer 11 are made minute, the density of the respective column-shaped crystals S that constitute this orientation control layer 11 can be increased, and further, it is also possible to increase the density of the column-shaped crystals S1 to S3 of the respective layers 12 to 14 that column-grow in the thickness direction from the apex section of each of these column-shaped crystals S.

As a result of conducting several investigations based on such knowledge, the present inventors have discovered that when crystal-growing each layer so that the crystal grains that constitute the magnetic layer or the non-magnetic layer, together with the crystal grains that constitute the orientation control layer, form column-shaped crystals in a consecutive manner in the thickness direction, by conducting lamination of the orientation control layer while the non-magnetic substrate is being cooled or immediately after the non-magnetic substrate has been cooled, it is possible to increase the nucleation density on the surface of the substrate, of the crystal grains that constitute the orientation control layer and thereby make the crystal grains of the orientation control layer finer, and increase the density of the respective column-shaped crystals that constitute this orientation control layer. Furthermore, it is possible to increase the density of the magnetic layer or the non-magnetic layer that column-grow in the thickness direction from the apex section of these respective column-shaped crystals.

That is to say, the manufacturing method of a magnetic recording medium to which the present invention is applied is a manufacturing method of a magnetic recording medium prepared such that at least on a non-magnetic substrate, there are laminated a soft magnetic base layer, an orientation control layer that controls the orientation of the layer immediately thereabove, and a perpendicular magnetic layer with the magnetization easy axis thereof primarily oriented perpendicular to the non-magnetic substrate. The manufacturing method is characterized in that when configuring the perpendicular magnetic layer with two or more magnetic layers and crystal-growing each layer so that the crystal grains that constitute the respective magnetic layers, together with the crystal grains that constitute the orientation control layer, form column-shaped crystals in a consecutive manner in the thickness direction, lamination of the orientation control layer is performed while the substrate is being cooled or immediately after the substrate has been cooled.

Moreover, the manufacturing method of a magnetic recording medium to which the present invention is applied is characterized in that a non-magnetic layer is arranged between the orientation control layer and the perpendicular magnetic layer, or the perpendicular magnetic layer is constituted by two or more magnetic layers and a non-magnetic layer is arranged between these magnetic layers, and when crystal-growing each layer so that the crystal grains that constitute the magnetic layer and the non-magnetic layer, together with the crystal grains that constitute the orientation control layer, form column-shaped crystals in a consecutive manner in the thickness direction, lamination of the orientation control layer is performed while the substrate is being cooled or immediately after the substrate has been cooled.

Conventionally, an orientation control layer is laminated on a non-magnetic substrate by means of a sputtering method or the like, but the non-magnetic substrate is not heated or cooled in the laminating procedure. However, in order to form a soft magnetic layer and the like under the orientation control layer by means of a sputtering method, the temperature of the substrate is raised to approximately 100° C. by plasma used for forming these films. Moreover, also when forming the orientation control layer, the non-magnetic substrate comes in contact with the plasma that forms sputtering particles, and therefore, the non-magnetic substrate is also heated by this plasma. Based on the above understanding, in the conventional formation of the orientation control layer, the temperature of this non-magnetic substrate is expected to be approximately in a range from 100 to 150° C. even without heating the non-magnetic substrate.

In contrast, in the present invention, when laminating the orientation control layer, the formation of the orientation control layer is performed while the non-magnetic substrate is being cooled or immediately after the non-magnetic substrate has been cooled. At this time, it is preferable that the temperature of the non-magnetic substrate be cooled to room temperature or lower, more preferably to −50° C. or lower, and most preferably to −200° C. or lower. "Immediately after the substrate has been cooled" describes that the formation of the orientation control layer is to be performed within a time difference not longer than one minute. Or, it describes that the formation of the orientation control layer is to be performed before the temperature of the cooled non-magnetic substrate has returned to room temperature.

Thereby, it is possible to increase the nucleation density on the substrate surface, of the crystal grains that constitute the orientation control layer. Moreover, it has been discovered that if the present invention is employed, the apex section of the respective column-shaped crystals that constitute the orientation control layer becomes smooth, and the flatness of the surface of the magnetic recording medium is enhanced, while the scratch resistance of the surface of the magnetic recording medium is improved.

Figure 2:
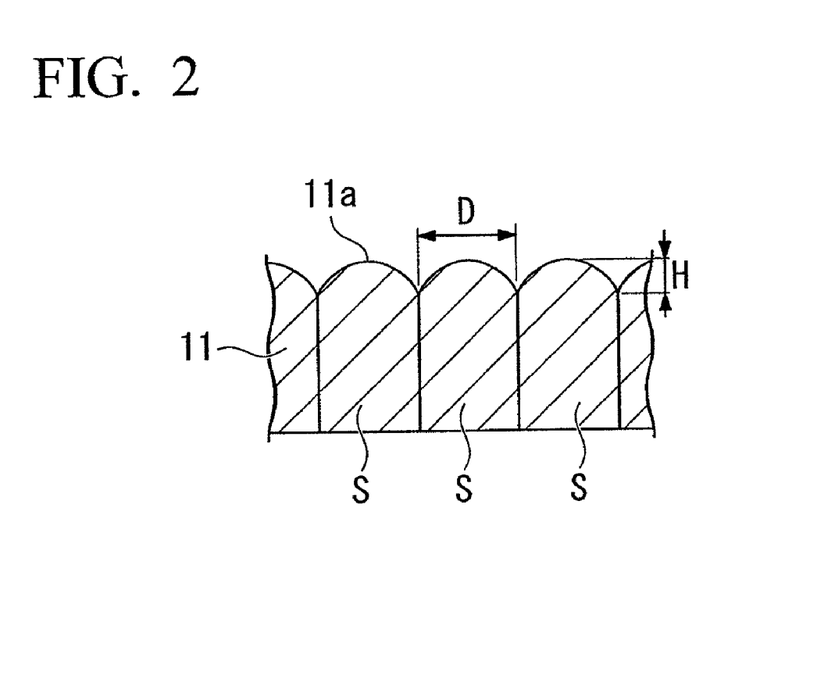
FIG. 2 is a cross-sectional view showing a crystal structure of an orientation control layer.

Furthermore, in the present invention, as shown in FIG. 2, on the convexo-concave surface 11a, the apex section of which is convexed, of each of the column-shaped crystals S that constitute the orientation control layer 11, the height H from the top-most apex section of each of the column-shaped crystals to the level where the clearance with the adjacent column-shaped crystal is none, is preferably not greater than the outer-most diameter D of each of the column-shaped crystals. Thereby, in the present invention, it is possible to: make each of the column-shaped crystals S formed with the crystal grains that constitute the orientation control layer 11 small; make the convexo-concave surface 11a, the apex section of which is convexed, of each of the column-shaped crystals S that constitute this orientation control layer 11 smooth; enhance the flatness of the surface of the magnetic recording medium; and increase the scratch resistance of the surface of the magnetic recording medium.

Moreover, in the present invention, the grain diameter of the crystal grains that constitute the orientation control layer is preferably not greater than 5 nm, and more preferably not greater than 3 nm. The grain diameter of the crystal grains that constitute the conventional orientation control layer is approximately in a range from 6 to 9 nm, however, in the present invention, this crystal grain diameter may be 5 nm or less. Thereby, in the present invention, it is possible to increase the density of magnetic grains in the magnetic recording medium twice or more, and as a result, it is also possible to increase the recording density of the magnetic recording medium twice or more.

Moreover, in the present invention, it is preferable that the non-magnetic substrate be fixed on a cooled holder to perform cooling of the non-magnetic substrate.

Here, the magnetic recording medium has a structure such that the soft magnetic layer, the orientation control layer, the magnetic layer, and a protective layer are laminated in this order on both or one of the surfaces of the non-magnetic substrate. Or, it has a structure such that the non-magnetic layer is arranged between the orientation control layer and the perpendicular magnetic layer, or the perpendicular magnetic layer is constituted by two or more magnetic layers and the non-magnetic layer is arranged between the magnetic layers.

Figure 3:
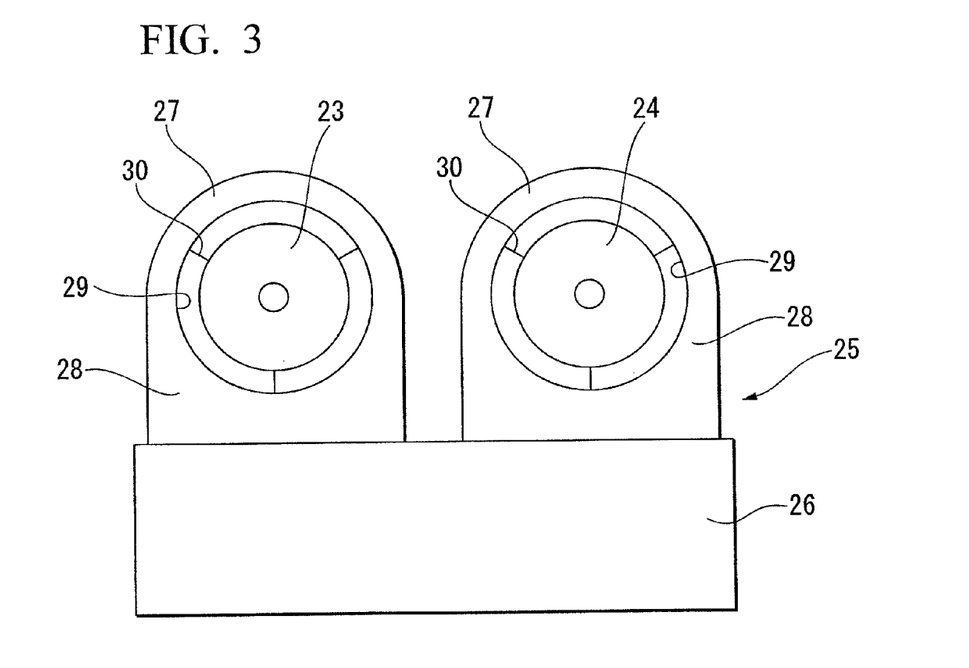
FIG. 3 is a side view showing a carrier of an in-line type film forming apparatus.

Such a magnetic recording medium is manufactured usually with use of an in-line type film forming apparatus that performs film formation procedures while film formation target substrates are being transported between a plurality of film formation chambers. Moreover, for example, a carrier 25 as shown in FIG. 3 is used for transporting substrates in the in-line type film forming apparatus.

The carrier 25 has a supporting base 26, and a plurality of substrate holders 27 provided on the upper surface of the supporting base 26. In the present embodiment, the configuration is equipped with two of the substrate holders 27. Therefore two non-magnetic substrates to be held on these substrate holders 27 are respectively treated as a first film forming substrate 23 and a second film forming substrate 24.

Each of the substrate holders 27 is configured such that in a plate body 28 having a thickness of one to several times the thickness of the first and second film forming substrates 23 and 24, there is formed a circular through hole 29 with a diameter slightly greater than the outer circumference of these film forming substrates 23 and 24. Moreover, on the periphery of the through hole 29, there are elastically and deformably attached a plurality of supporting members 30 projecting towards the inner side of this through hole 29. Three pieces of these supporting members 30 are provided at equal intervals in an angular range of 120° on the periphery of the through hole 29 of the holder 27, so as to support the outer circumference section of the first and second film forming substrates 23 and 24 arranged on the inner side of the through hole 29 at three points, namely; a lower side supporting point at the lowest position on the outer circumference thereof, and a pair of upper side supporting points at the upper side position on the outer circumference thereof symmetric about the center line that passes through this lower side supporting point along the direction of gravitational force.

Thereby, the carrier 25 is capable of attachably and detachably holding, on the substrate holders 27, the first and second film forming substrates 23 and 24 fitted on the inner side of these supporting members 30, while the outer circumferences of the first and second film forming substrates 23 and 24 are in contact with these three supporting members 30. Moreover, the first and second film forming substrates 23 and 24 are held in the respective substrate holders 27 in a state of being held in a vertical orientation (in a state where the principal surfaces of the substrates 23 and 24 are parallel with the direction of gravitational force). That is to say, these substrate holders 27 are provided in parallel positions on the upper surface of the supporting base 26 so that the principal surfaces of the first and second film forming substrates 23 and 24 are substantially orthogonal to the upper surface of the supporting base 26.

When film formation is performed on the first and second film forming substrates 23 and 24, such conventionally used carrier 25 holds the first and second film forming substrates 23 and 24 with three or more of the supporting members 30 without being influenced by the substrate holders 27, and provides clearances of approximately 20 nm between these first and second film forming substrates 23 and 24 and the through hole 29 of each of the substrate holders 27.

In this case, even if these substrate holders 27 are cooled in a state where the substrate holders 27 are holding the first and second film forming substrates 23 and 24, the first and second film forming substrates 23 and 24 cannot be effectively cooled.

Figure 4:
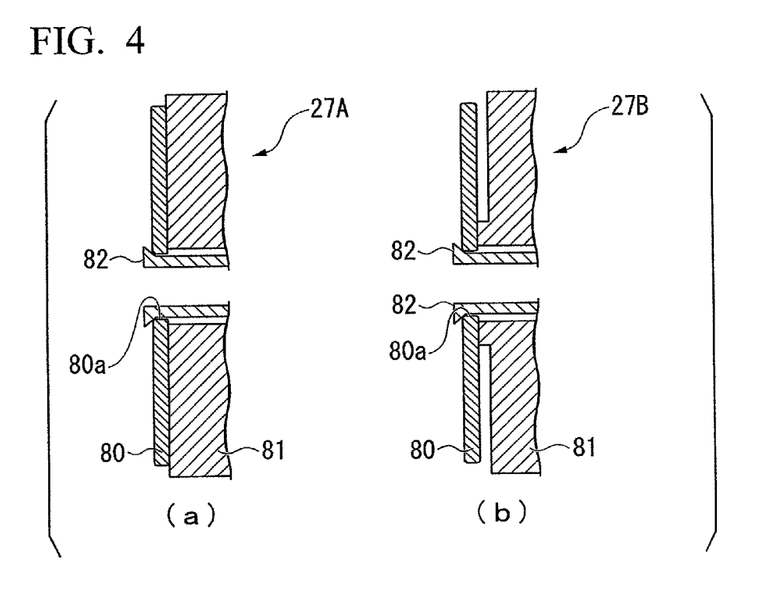
FIG. 4 is a cross-sectional view showing examples of a substrate holder for cooling.

Consequently, in the present invention, in order to increase the efficiency of the substrate holders 27 for cooling the first and second film forming substrates 23 and 24, the first and second film forming substrates 23 and 24 having been transported by the carrier 25 shown in FIG. 3 are transferred, for example, into cooling substrate holders 27A and 27B having structures shown in FIG. 4 (a) and FIG. 4 (b). In the present invention, film formation of the orientation control layer is performed on the first and second film forming substrates 23 and 24 (shown collectively as a substrate 80 in FIG. 4 (a) and FIG. 4 (b)) that have been efficiently cooled by these cooling substrate holders 27A and 27B.

These cooling substrate holders 27A and 27B, as shown in FIG. 4 (a) and FIG. 4 (b), respectively have a cooling base 81 on which the substrate 80 is to be loaded, and a plurality of chuck pins 82 that hold the inner side of an opening section 80a provided in the center section of the substrate 80.

The cooling base 81 has a mechanism of supplying a cooling fluid into the interior thereof by means of a pump (not shown in the drawing), and water, liquid nitrogen, or the like is used as the cooling fluid. Moreover, if water is used, the substrate 80 can be cooled to approximately 15° C., and if liquid nitrogen is used, the substrate 80 can be cooled to approximately −190° C. Further, if a cryopump is used, the substrate 80 can be cooled to approximately 50 K.

Since the cooling substrate holder 27A with the structure shown in FIG. 4 (a) has a configuration in which one of the surfaces of the substrate 80 comes in contact with the cooling base 81, the area of contact between the substrate 80 and the cooling base 81 is large, and the ability of the cooling substrate holder 27A to cool the substrate 80 can be increased. However, there is a possibility that one of the surfaces of the substrate 80 in contact with the cooling base 81 may be contaminated, and only one surface of the magnetic recording medium may eventually become available for use in some cases.

On the other hand, since the cooling substrate holder 27B having the structure shown in FIG. 4 (b) has a configuration in which the cooling base 81 comes in contact with the inner portion of the magnetic recording medium that is not to be used for magnetic recording to cool the substrate 80, it is possible to eventually use both of the surfaces of the magnetic recording medium. In this case, following the formation of an orientation control layer performed on one surface of the substrate 80, the substrate 80 is reversed so as to be held by the cooling substrate holder 27B again, and an orientation control layer is formed on the opposite side surface of the substrate 80.

Thus, in the present invention, in a case where the orientation control layer is formed while a substrate S is loaded on the cooling substrate holders 27A and 27B shown in FIG. 4 (a) and FIG. 4 (b), film formation is performed on each surface of the substrate S. In contrast, in a case where the substrate S is transferred into another substrate holder 27 shown in FIG. 3 after the substrate S has been cooled by the cooling substrate holders 27A and 27B shown in FIG. 4 (a) and FIG. 4 (b), film formation can be performed on both of the surfaces at the same time.

Figure 5:
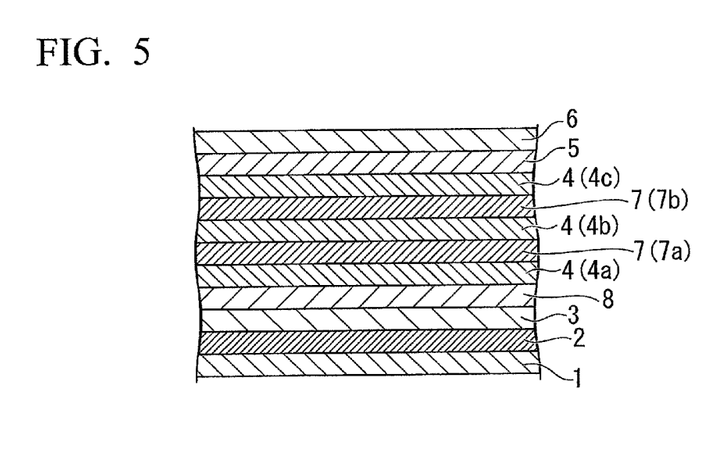
FIG. 5 is a cross-sectional view showing an example of a magnetic recording medium to be manufactured with application of the present invention.

FIG. 5 shows an example of a magnetic recording medium to be manufactured with application of the present invention.

As shown in FIG. 5, this magnetic recording medium has a structure in which a soft magnetic base layer 2, an orientation control layer 3, a perpendicular magnetic layer 4, a protective layer 5, and a lubricating layer 6 are sequentially laminated on a non-magnetic substrate 1.

Among these layers, the soft magnetic base layer 2 and the orientation control layer 3 constitute a base layer. On the other hand, the perpendicular magnetic layer 4 has a structure in which from the non-magnetic substrate 1 side, it includes three layers, namely; a lower magnetic layer 4a, an intermediate magnetic layer 4b, and an upper magnetic layer 4c, and between the magnetic layer 4a and the magnetic layer 4b there is included a lower non-magnetic layer 7a, and between the magnetic layer 4b and the magnetic layer 4c there is included an upper non-magnetic layer 7b, thereby alternately laminating these magnetic layers 4a to 4c and the non-magnetic layers 7a and 7b.

Furthermore, although omitted in the drawing, the crystal grains that constitute the respective magnetic layers 4a to 4c and non-magnetic layers 7a and 7b, together with the crystal grains that constitute the orientation control layer 3, form column-shaped crystals in a consecutive manner in the thickness direction.

As the non-magnetic substrate 1, for example, there may be used a metallic substrate formed of a metallic material such as aluminum and aluminum alloy, and for example, there may also be used a non-metallic substrate formed of a non-metallic material such as glass, ceramic, silicon, silicon carbide, and carbon. Moreover, there may be used one such that an NiP layer or an NiP alloy layer is formed on the surface of the metallic substrate or the non-metallic substrate by means of a plating method or sputtering method.

As a glass substrate, for example, there may be used amorphous glass, crystallized glass or the like, and as the amorphous glass, for example, there may be used general purpose soda lime glass, aluminosilicate glass or the like. Moreover, as the crystallized glass, for example, there may be used lithium based crystallized glass. As a ceramic substrate, for example, there may be used a sintered body or a fiber-reinforced material thereof having general purpose aluminum oxide, aluminum nitride, silicon nitride, or the like serving as the major component thereof.

The average surface roughness (Ra) of the non-magnetic substrate 1 is preferably not greater than 2 nm (20 Å), and more preferably not greater than 1 nm, since it is suitable for high record-density recording with a low-flying magnetic head. Moreover, the micro waviness (Wa) of the surface is preferably not greater than 0.3 nm (more preferably not greater than 0.25 nm), since it is suitable for high record-density recording with a low-flying magnetic head. Furthermore, for the flight stability of the magnetic head, it is preferable to make the surface average roughness (Ra) of at least one of either the chamfered surface of the chamfer section of the end surface or the side face section, to be not greater than 10 nm (more preferably not greater than 9.5 nm). The micro waviness (Wa) can, for example, be measured as a surface average roughness at a measuring range of 80 μm, by using a surface roughness measuring apparatus P-12 (product of KLM-Tencor).

Moreover, if the non-magnetic substrate 1 comes in contact with the soft magnetic base layer 2 having Co or Fe serving as the major component thereof, then adsorption gas of the surface, influence of moisture, dispersion of substrate components, and the like may cause corrosion to develop in some cases. In this case, it is preferable that an adhesive layer be provided between the non-magnetic substrate 1 and the soft magnetic base layer 2. Thereby it is possible to suppress the corrosion. As the material of the adhesive layer, for example, Cr, Cr alloy, Ti, Ti alloy, and the like may be appropriately selected for use. Moreover, the thickness of the adhesive layer is preferably not less than 2 nm (30 Å).

The soft magnetic base layer 2 is provided in order to increase the perpendicular direction component, with respect to the substrate surface, of the magnetic flux generated from the magnetic head, and also to have the direction of magnetization of the perpendicular magnetic layer 4, on which information is to be recorded, more firmly fixed into a direction perpendicular to the non-magnetic substrate 1. This effect emerges more significantly particularly when a single magnetic pole head for perpendicular recording is used as a recording/reproducing magnetic head.

As the soft magnetic base layer 2, for example, there may be used a soft magnetic material containing Fe, Ni, Co, and the like. Specific examples of the soft magnetic material include CoFe based alloy (CoFeTaZr, CoFeZrNb, and the like), FeCo based alloy (FeCo, FeCoV, and the like), FeNi based alloy (FeNi, FeNiMo, FeNiCr, FeNiSi, and the like), FeAl based alloy (FeAl, FeAlSi, FeAlSiCr, FeAlSiTiRu, FeAlO, and the like), FeCr based alloy (FeCr, FeCrTi, FeCrCu, and the like), FeTa based alloy (FeTa, FeTaC, FeTaN, and the like), FeMg based alloy (FeMgO and the like), FeZr based alloy (FeZrN and the like), FeC based alloy, FeN based alloy, FeSi based alloy, FeP based alloy, FeNb based alloy, FeHf based alloy, FeB based alloy, and the like.

Moreover, as the soft magnetic base layer 2, there may be used a material having a microcrystal structure such as FeAlO, FeMgO, FeTaN, FeZrN, and the like containing 60 at % (atomic percent) or more of Fe, or a material having a granular structure in which micro crystal grains are dispersed into a matrix.

In addition, as the soft magnetic base layer 2, there may be used Co alloy that contains 80 at % or more of Co, contains at least any one of Zr, Nb, Ta, Cr, Mo, and the like, and has an amorphous structure. Specific examples of the suitable material of this include CoZr, CoZrNb, CoZrTa, CoZrCr, CoZrMo based alloys.

The coercivity Hc of the soft magnetic base layer 2 is preferably not greater than 100 (Oe) (more preferably not greater than 20 (Oe). Note, 1 Oe is 79 A/m. If this coercivity Hc exceeds the above range, the soft magnetic characteristic becomes insufficient, the reproduction waveform transforms from a so-called rectangular waveform into a distorted waveform, and it is therefore not preferable.

The saturation flux density Bs of the soft magnetic base layer 2 is preferably not less than 0.6 T (more preferably not less than 1 T). If this Bs is under the above range, the reproduction waveform transforms from a so-called rectangular waveform to a distorted waveform, and it is therefore not preferable.

Moreover, the product Bs·t (T·nm) of the saturation flux density Bs (T) of the soft magnetic base layer 2 and the layer thickness t (nm) of the soft magnetic base layer 2, is preferably not less than 15 (T·nm) (more preferably not less than 25 (T·nm). If this Bs·t is under the above range, the reproduction waveform gets distorted and the OW (OverWrite) characteristic (recording characteristic) is degenerated, and it is therefore not preferable.

It is preferably that the soft magnetic base layer 2 be configured of two soft magnetic films, and an Ru film be provided between the two soft magnetic films. By adjusting the film thickness of the Ru film within a range from 0.4 to 1.0 nm or from 1.6 to 2.6 nm, these two layers of soft magnetic films form an AFC structure, and by employing such an AFC structure, so-called spike noise can be suppressed.

It is preferable that the top-most surface of the soft magnetic base layer 2 (the surface on the orientation control layer 3 side) be formed with the partially or completely oxidized material that constitutes this soft magnetic base layer 2. For example, it is preferable that the material that constitutes the soft magnetic base layer 2 be partially oxidized, or an oxide of the above material be formed and arranged on the surface (the surface on the orientation control layer 3 side) and in the proximity of the soft magnetic base layer 2. Thereby, magnetic fluctuation on the surface of the soft magnetic base layer 2 can be suppressed, and it is consequently possible to reduce noise caused by this magnetic fluctuation, thereby improving the recording/reproducing characteristic of the magnetic recording medium.

Moreover, the orientation control layer 3 formed on the soft magnetic base layer 2 can improve the recording/reproducing characteristic by making the crystal grains of the perpendicular magnetic layer 2 minute. There are no particular limitations on such material, however, one having an hcp structure, fcc structure, and amorphous structure is preferred. In particular, Ru based alloy, Ni based alloy, Co based alloy, Pt based alloy, and Cu based alloy are preferable, and these alloys may be multiple-layered. For example, it is preferable to employ, from the substrate side, a multiple layer structure of an Ni based alloy and Ru based alloy, a multiple layer structure of a Co based alloy and Ru based alloy, and a multiple layer structure of a Pt based alloy and Ru based alloy.

For example, in the case of a Ni based alloy, it is preferably composed of at least a type of material selected from NiW alloy, NiTa alloy, NiNb alloy, NiTi alloy, NiZr alloy, NiMn alloy, and NiFe alloy respectively containing 33 to 96 at % of Ni. Moreover, it may be a non-magnetic material that contains 33 to 96 at % of Ni and at least contains any one or more of Sc, Y, Ti, Zr, Hf, Nb, Ta, and C. In this case, the amount of Ni content is preferably in a range from 33 at % to 96 at % in order to maintain the effect of the orientation control layer 3 and have a range with no magnetism.

In the magnetic recording medium of the present embodiment, in a case where the orientation control layer 3 is of a two-layer structure with an NiW alloy layer (lower layer) and an Ru layer (upper layer), the layer thickness of the NiW alloy layer may be approximately 6 nm and the layer thickness of the Ru layer may be approximately 15 nm. If this layer thickness is made the thinnest thickness possible, it can make the distance between the magnetic head and the soft magnetic base layer 2 small when recording is performed, and it is consequently possible to increase the recording/reproducing characteristic without reducing the resolution of reproduction signals.

Moreover, oxygen, nitrogen and the like may be introduced into the film formation gas for the orientation control layer 3. For example, in a case of using the sputtering method as the film forming method, as a processing gas, there are suitably used a gas containing a mixture of argon and approximately 0.05 to 50% (preferably 0.1 to 20%) volume fraction of oxygen, and a gas containing a mixture of argon and 0.01 to 20% (preferably 0.02 to 10%) volume fraction of nitrogen.

Moreover, the orientation control layer 3 may also be of a structure in which metallic grains are dispersed in an oxide, metallic nitride, or metallic carbide. In order to have such structure, it is preferable to use an alloy material that contains an oxide, metallic nitride, or metallic carbide. Specific examples of the oxide that may be used include $SiO_2$, $Al_2O_3$, $Ta_2O_5$, $Cr_2O_3$, MgO, $Y_2O_3$, $TiO_2$ and the like, specific examples of the metallic nitride that may be used include MN, $Si_3N_4$, TaN, CrN and the like, and specific examples of the metallic carbide that may be used include TaC, Bc, SiC and the like. Furthermore, for example, NiTa—$SiO_2$, RuCo—$Ta_2O_5$, Ru—$SiO_2$, Pt—$Si_3N_4$, Pd—TaC and the like may be used.

The amount of the oxide, metallic nitride, or metallic carbide contained in the orientation control layer 3 with respect to the alloy is preferably not less than 1 mol % and not greater than 12 mol %. If the amount of oxide, metallic nitride, or metallic carbide contained in the orientation control layer 3 exceeds the above range, it is not preferable because the oxide, metallic nitride, or metallic carbide may remain in the metallic grains and the crystallinity and orientation of the metallic grains may be degraded, while, in addition, the crystallinity and orientation of the magnetic layer formed on the orientation control layer 3 may be degraded in some cases. Moreover, if the amount of the oxide, metallic nitride, or metallic carbide contained in the orientation control layer 3 is under the above range, it is not preferable because there cannot be obtained the effect associated with the addition of the oxide, metallic nitride, or metallic carbide.

Furthermore, it is preferable that a non-magnetic base layer 8 be provided between the orientation control layer 3 and the perpendicular magnetic layer 4. In the initial portion of the perpendicular magnetic layer 4 immediately above the orientation control layer 3, disturbance is likely to occur in crystal growth and this becomes a cause of noise. By replacing the disturbed portion in this initial portion with the non-magnetic base layer 8, it is possible to suppress the occurrence of noise.

It is preferable that the non-magnetic base layer 8 be composed of a material that has Co serving as its major component and that further contains an oxide 41. The amount of Cr content is preferably not less than 25 at % (atomic percent) and not greater than 50 at %. As the oxide 41, for example, use of oxides such as Cr, Si, Ta, Al, Ti, Mg, Co and the like is preferred, and above all, $TiO_2$, $Cr_2O_3$, $SiO_2$ and the like may be suitably used in particular. The preferred amount of oxide content is not less than 3 mol % and not greater than 18 mol % with respect to the total mol amount that is calculated where the alloy of, for example, Co, Cr, Pt and the like that constitute the magnetic grains are treated as a single compound.

Moreover, the non-magnetic base layer 8 is preferably composed of a composite oxide in which two or more types of oxides are added. In particular, $Cr_2O_3$—$SiO_2$, $Cr_2O_3$—$TiO_2$, $Cr_2O_3$—$SiO_2$—$TiO_2$ and the like may be suitably used. Furthermore, CoCr—$SiO_2$, CoCr—$TiO_2$, CoCr—$Cr_2O_3$—$SiO_2$, CoCr—$TiO_2$—$Cr_2O_3$, CoCr—$Cr_2O_3$—$TiO_2$—$SiO_2$ and the like may be suitably used. Also, Pt may be added from a view point of crystal growth.

The preferred thickness of the non-magnetic base layer 8 is not less than 0.2 nm and not greater than 3 nm. A thickness exceeding 3 nm is not preferable because it would cause Hc and Hn to reduce.

The magnetic layer 4a is composed of a material that has Co serving as its major component and that further contains the oxide 41, and use of oxides such as Cr, Si, Ta, Al, Ti, Mg, Co and the like as this oxide 41 is preferable. Above all, in particular, $TiO_2$, $Cr_2O_3$, $SiO_2$ and the like may be suitably used. Moreover, the magnetic layer 4a is preferably composed of a composite oxide in which two or more types of oxides are added. In particular, $Cr_2O_3$—$SiO_2$, $Cr_2O_3$—$TiO_2$, $Cr_2O_3$—$SiO_2$—$TiO_2$ and the like may be suitably used.

Figure 6:
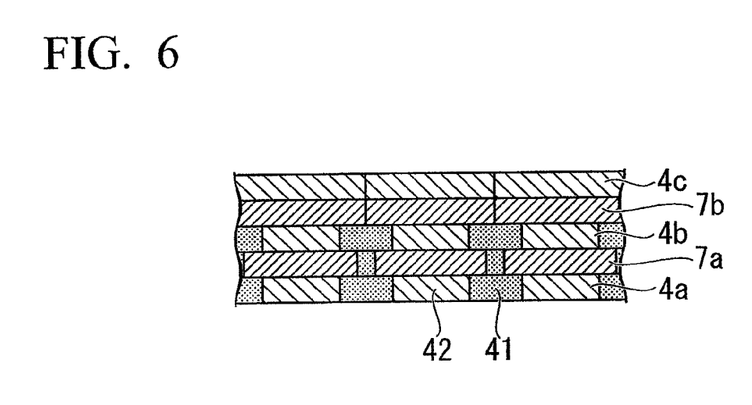
FIG. 6 is an enlarged cross-sectional view showing a laminated structure of magnetic layers and non-magnetic layers.

In the magnetic layer 4a, it is preferable that magnetic grains (crystal grains having magnetism) 42 be dispersed. Moreover, as shown in FIG. 6, the magnetic grains 42 preferably form column-shaped structures that vertically pass through the magnetic layers 4a and 4b, and further the magnetic layer 4c. By having such a structure, superior orientation and crystallinity of the magnetic layer 4a and magnetic grains 42 can be achieved, and as a result, a signal/noise ratio (SN ratio) that is suitable for high density recording can be obtained.

In order to obtain such structure, the amount of the oxide 41 to be contained and the conditions of forming the magnetic layer 4a become important. That is to say, the preferred amount of oxide 41 content is not less than 3 mol % and not greater than 18 mol % with respect to the total mol amount that is calculated where the alloy of, for example, Co, Cr, Pt and the like that constitute the magnetic grains 42 are treated as a single compound. It is more preferably not less than 6 mol % and not greater than 13 mol %.

The preferred amount of the oxide 41 content in the magnetic layer 4a is within the above range, because when this magnetic layer 4a is formed, the oxide 41 is deposited around the magnetic grains 42, and it becomes possible to separate the magnetic grains 42 and make them minute. On the other hand, an amount of the oxide 41 content exceeding the above range is not preferable because; the oxide 41 remains in the magnetic grains 42, the orientation and crystallinity of the magnetic grains 42 are degraded, and furthermore the oxide 41 is deposited above and below the magnetic grains 42, and as a result, the magnetic grains 42 will not form the column-shaped structures that vertically pass through the magnetic layers 4a to 4c. Moreover, an amount of the oxide 41 content below the above range is not preferable because separation and miniaturization of the magnetic grains 42 become insufficient, noise in recording/reproducing is increased as a result, and a signal/noise ratio (S/N ratio) that is suitable for high density recording cannot be obtained.

The preferred amount of Cr contained in the magnetic layer 4a is not less than 4 at % and not greater than 19 at % (more preferably not less than 6 at % and not greater than 17 at %). The reason why the amount of Cr content is set within the above range is so that the magnetic anisotropic constant Ku of the magnetic grains 42 is not overly lowered, and so that a high level of magnetization is maintained, and as a result, a recording/reproducing characteristic that is suitable for high density recording and a sufficient thermal fluctuation characteristic can be obtained.

On the other hand, an amount of the Cr content exceeding the above range is not preferable because the magnetic anisotropic constant Ku of the magnetic grains 42 becomes small and consequently the thermal fluctuation characteristic is deteriorated. Furthermore, the crystallinity and orientation of the magnetic grains 42 are deteriorated, and the recording/reproducing characteristic becomes deteriorated as a result.

Moreover, the amount of the Cr content below the above range is not preferable because the magnetic anisotropic constant Ku of the magnetic grains 42 is high, and consequently the perpendicular coercivity becomes too high and sufficient writing cannot be performed when recording data, and as a result the recording characteristic (OW) becomes unsuitable for high density recording.

The preferred amount of Pt content in the magnetic layer 4a is not less than 8 at % and not greater than 20 at %. The amount of the Pt content is set within the above range, because if it is below 8 at %, the magnetic anisotropic constant Ku required for the perpendicular magnetic layer 4 becomes low. In contrast, if it exceeds 20 at %, lamination defects occur within the magnetic grains 42, and the magnetic anisotropic constant Ku becomes low as a result. Consequently, in order to obtain a thermal fluctuation characteristic and recording/reproducing characteristic suitable for high density recording, the amount of the Pt content is preferably set within the above range.

Moreover, the amount of the Pt content exceeding the above range is not preferable because a layer having an fcc structure is formed in the magnetic grains 42, and the crystallinity and orientation may be degraded in some cases. On the other hand, the amount of the Pt content below the above range is not preferable because the magnetic anisotropic constant Ku for obtaining a thermal fluctuation characteristic suitable for high density recording cannot be obtained.

In addition to Co, Cr, Pt, and the oxide 41, the magnetic layer 4a may contain one or more types of elements selected from B, Ta, Mo, Cu, Nd, W, Nb, Sm, Tb, Ru, and Re. By containing the above elements, it is possible to promote miniaturization of the magnetic grains 42 and improve the crystallinity and orientation, and a recording/reproducing characteristic and thermal fluctuation characteristic more suitable for high density recording can be obtained.

Furthermore, the preferred total amount of the content of the above elements is not greater than 8 at %. An amount exceeding 8 at % is not preferable because phases other than hcp phases are formed in the magnetic grains 42. Consequently the crystallinity and orientation of the magnetic grains 42 are disturbed, and as a result a recording/reproducing characteristic and thermal fluctuation characteristic suitable for high density recording cannot be obtained.

Specific examples of materials suitable for the magnetic layer 4a, in addition to 90(Co14Cr18Pt)-10($SiO_2$) {calculated mol concentration 90 mol % where the magnetic grains constituted of Cr content 14 at %, Pt content 18 at % and remnant Co are treated as a single compound, and the oxide composition composed of $SiO_2$ is 10 mol %}, 92(Co10Cr16Pt)-8($SiO_2$), and 94(Co8Cr14Pt4Nb)-6($Cr_2O_3$), include (CoCrPt)—($Ta_2O_5$), (CoCrPt)—($Cr_2O_3$)—($TiO_2$), (CoCrPt)—($Cr_2O_3$)—($SiO_2$), (CoCrPt)—($Cr_2O_3$)—($SiO_2$)—($TiO_2$), (CoCrPtMo)—(TiO), (CoCrPtW)—($TiO_2$), (CoCrPtB)—($Al_2O_3$), (CoCrPtTaNd)—(MgO), (CoCrPtBCu)—($Y_2O_3$), and (CoCrPtRu)—($SiO_2$).

It is preferable that the magnetic layer 4b be composed of a material that has Co serving as its major component and that further contains an oxide 41. The oxide 41 is preferably an oxide of Cr, Si, Ta, Al, Ti, Mg, and Co. Above all, in particular, $TiO_2$, $Cr_2O_3$, and $SiO_2$ may be suitably used. Moreover, the magnetic layer 4b is preferably composed of a composite oxide in which two or more types of oxides 41 are added. In particular, $Cr_2O_3$—$SiO_2$, $Cr_2O_3$—$TiO_2$, $Cr_2O_3$—$SiO_2$—$TiO_2$ and the like may be suitably used.

In the magnetic layer 4b, it is preferable that magnetic grains (crystal grains having magnetism) 42 be dispersed. As shown in FIG. 6, these magnetic grains 42 preferably form column-shaped structures that vertically pass through the magnetic layers 4a and 4b, and further the magnetic layer 4c. By forming such a structure, superior orientation and crystallinity of the magnetic layer 4b and magnetic grains 42 can be achieved, and as a result, a signal/noise ratio (S/N ratio) that is suitable for high density recording can be obtained.

The preferred amount of the oxide 41 content in the magnetic layer 4b with respect to the total amount of the compound of, for example, Co, Cr, Pt and the like that constitute the magnetic grains 42, is not less than 3 mol % and not greater than 18 mol %. It is more preferably not less than 6 mol % and not greater than 13 mol %.

The preferred amount of the oxide 41 content in the magnetic layer 4b is within the above range, because when this magnetic layer 4b is formed, the oxide 41 is deposited around the magnetic grains 42, and it becomes possible to separate the magnetic grains 42 and make them minute. On the other hand, an amount of the oxide 41 content exceeding the above range is not preferable because; the oxide 41 remains in the magnetic grains 42, the orientation and crystallinity of the magnetic grains 42 are degraded, and furthermore the oxide 41 is deposited above and below the magnetic grains 42, and as a result, the magnetic grains 42 will not form the column-shaped structures that vertically pass through the magnetic layers 4a to 4c. Moreover, an amount of the oxide 41 content below the above range is not preferable because separation and miniaturization of the magnetic grains 42 become insufficient, noise in recording/reproducing is increased as a result, and a signal/noise ratio (S/N ratio) that is suitable for high density recording cannot be obtained.

The preferred amount of Cr contained in the magnetic layer 4b is not less than 4 at % and not greater than 18 at % (more preferably not less than 8 at % and not greater than 15 at %). The reason why the amount of Cr content is set within the above range is so that the magnetic anisotropic constant Ku of the magnetic grains 42 is not overly lowered, and so that a high level of magnetization is maintained, and as a result, a recording/reproducing characteristic that is suitable for high density recording and a sufficient thermal fluctuation characteristic can be obtained.

On the other hand, an amount of the Cr content exceeding the above range is not preferable because the magnetic anisotropic constant Ku of the magnetic grains 42 becomes small and consequently the thermal fluctuation characteristic is deteriorated. Furthermore, the crystallinity and orientation of the magnetic grains 42 are deteriorated, and the recording/reproducing characteristic becomes deteriorated as a result. Moreover, the amount of the Cr content below the above range is not preferable because the magnetic anisotropic constant Ku of the magnetic grains 42 is high, and consequently the perpendicular coercivity becomes too high and sufficient writing cannot be performed when recording data, and as a result the recording characteristic (OW) becomes unsuitable for high density recording.

The preferred amount of Pt content in the magnetic layer 4b is not less than 10 at % and not greater than 22 at %. The amount of the Pt content is set within the above range, because if it is below 10 at %, the magnetic anisotropic constant Ku required for the perpendicular magnetic layer 4 becomes low, and it is not preferable. Moreover, the amount of the Pt content exceeding 22 at % is not preferable because it would cause lamination defects to occur within the magnetic grains 42, and the magnetic anisotropic constant Ku becomes low as a result. In order to obtain a thermal fluctuation characteristic and recording/reproducing characteristic suitable for high density recording, the amount of the Pt content is preferably set within the above range.

Moreover, the amount of the Pt content exceeding the above range is not preferable because a layer having an fcc structure is formed in the magnetic grains 42, and the crystallinity and orientation may be degraded in some cases. On the other hand, the amount of the Pt content below the above range is not preferable because the magnetic anisotropic constant Ku for obtaining a thermal fluctuation characteristic suitable for high density recording cannot be obtained.

In addition to Co, Cr, Pt, and the oxide 41, the magnetic layer 4b may contain one or more types of elements selected from B, Ta, Mo, Cu, Nd, W, Nb, Sm, Tb, Ru, and Re. By containing the above elements, it is possible to promote miniaturization of the magnetic grains 42 and improve the crystallinity and orientation, and a recording/reproducing characteristic and thermal fluctuation characteristic more suitable for high density recording can be obtained.

Furthermore, the preferred total amount of the content of the above elements is not greater than 8 at %. An amount exceeding 8 at % is not preferable because phases other than hcp phases are formed in the magnetic grains 42. Consequently the crystallinity and orientation of the magnetic grains 42 are disturbed, and as a result, a recording/reproducing characteristic and thermal fluctuation characteristic suitable for high density recording cannot be obtained.

The magnetic layer 4c is preferably composed of a material that contains Co serving as its major component and that does not contain oxide, and as shown in FIG. 6, it is preferably of a structure in which the magnetic grains 42 in the layer are growing epitaxially in column shapes from the magnetic grains 42 in the magnetic layer 4a. In this case, the magnetic grains 42 of the magnetic layers 4a to 4c preferably grow epitaxially in column shapes so as to correspond one-to-one in the respective layers. Moreover, since the magnetic grains 42 of the magnetic layer 4b grow epitaxially from the magnetic grains 42 in the magnetic layer 4a, the magnetic grains 42 of the magnetic layer 4b become minute, and furthermore, the crystallinity and orientation thereof become further improved.

The preferred amount of Pt content in the magnetic layer 4c is not less than 10 at % and not greater than 24 at %. With the amount of the Cr content within the above range, it is possible to sufficiently ensure the output in data reproduction while a further superior thermal fluctuation characteristic can be obtained. On the other hand, an amount of the Cr content exceeding the above range is not preferable because the magnetization of the magnetic layer 4c becomes too small. Furthermore, an amount of the Cr content below the above range is not preferable because sufficient separation and miniaturization of the magnetic grains 42 will not occur, noise in recording/reproducing is increased, and a signal/noise ratio (S/N ratio) that is suitable for high density recording cannot be obtained.

Moreover, the magnetic layer 4c may be composed of a material that contains Pt in addition to Co and Cr. The preferred amount of the Pt content in the magnetic layer 4c is not less than 8 at % and not greater than 20 at %. If the amount of the Pt content is within the above range, it is possible to obtain sufficient coercitivity that is suitable for high density recording, and further, a high level of reproduction output in recording/reproducing can be maintained. As a result, a recording/reproducing characteristic and thermal fluctuation characteristic suitable for high density recording can be obtained.

In contrast, an amount of the Pt content exceeding the above range is not preferable because a layer having an fcc structure will be formed in the magnetic layer 4c, and the crystallinity and orientation may be degraded in some cases.

Moreover, an amount of the Pt content below the above range is not preferable because the magnetic anisotropic constant Ku for obtaining a thermal fluctuation characteristic suitable for high density recording cannot be obtained.

In addition to Co, Cr, and Pt, the magnetic layer 4c may contain one or more types of elements selected from B, Ta, Mo, Cu, Nd, W, Nb, Sm, Tb, Ru, Re, and Mn. By containing the above elements, it is possible to promote miniaturization of the magnetic grains 42 and improve the crystallinity and orientation, and a recording/reproducing characteristic and thermal fluctuation characteristic more suitable for high density recording can be obtained.

Furthermore, the preferred total amount of the content of the above elements is not greater than 16 at %. On the other hand, an amount exceeding 16 at % is not preferable because phases other than hcp phases are formed in the magnetic grains 42. Consequently the crystallinity and orientation of the magnetic grains 42 are disturbed, and as a result, a recording/reproducing characteristic and thermal fluctuation characteristic suitable for high density recording cannot be obtained.

Specific examples of the material that is suitable for the magnetic layer 4c include CoCrPt based materials and CoCrPtB based materials. In the case of CoCrPtB based material, the preferred total amount of the content of Cr and B is not less than 18 at % and not greater than 28 at %.

As the material suitable for the magnetic layer 4c, for example, for the CoCrPt based material, Co14-24Cr8-22Pt {Cr content 14 to 24 at %, Pt content 8 to 22 at %, and remnant Co} is preferred, and for the CoCrPtB based material, Co10-24Cr8-22Pt0-16 {Cr content 10 to 24 at %, Pt content 8 to 22 at %, B content 0-16 at %, and remnant Co} is preferred. As for other materials, examples of CoCrPtTa based material include Co10-24Cr8-22Pt1-5Ta {Cr content 10 to 24 at %, Pt content 8 to 22 at %, Ta content 1 to 5 at %, and remnant Co} and examples of CoCrPtTaB based material include Co10-24Cr8-22Pt1-5Ta1-10B {Cr content 10 to 24 at %, Pt content 8 to 22 at %, Ta content 1 to 5 at %, B content 1 to 10 at %, and remnant Co}, and in addition, materials such as CoCrPtBNd based material, CoCrPtTaNd based material, CoCrPtNb based material, CoCrPtBW based material, CoCrPtMo based material, CoCrPtCuRu based material, and CoCrPtRe based material may be taken as examples.

The perpendicular coercivity (Hc) of the perpendicular magnetic layer 4 is preferably not less than 3,000 [Oe]. If the coercivity is below 3,000 [Oe], it is not favorable as a high density recording medium because the recording/reproducing characteristic, in particular, frequency characteristic becomes inadequate and the thermal fluctuation characteristic becomes deteriorated.

The reversed domain nucleation magnetic field (−Hn) of the perpendicular magnetic layer 4 is preferably not less than 1,500 [Oe]. A reversed domain nucleation magnetic field (−Hn) below 1,500 [Oe] is not preferable because the thermal fluctuation resistance becomes inferior.

The preferred average grain diameter of the magnetic grains of the perpendicular magnetic layer 4 is 3 to 12 nm. This average grain diameter can be found, for example, by observing the perpendicular magnetic layer 4 on a TEM (transmission electron microscope) and image-processing the observed image.

The preferred thickness of the perpendicular magnetic layer 4 is 5 to 20 nm. If the thickness of the perpendicular magnetic layer 4 is below the above range, sufficient reproduction output cannot be obtained and the thermal fluctuation characteristic is also reduced. Moreover, a thickness of the perpendicular magnetic layer 4 exceeding the above range is not preferable because the magnetic grains in the perpendicular magnetic layer 4 become enlarged, noise in recording/reproducing becomes increased, and the recording/reproducing characteristics such as signal/noise ratio (S/N ratio) and recording characteristic (OW) become deteriorated.

The protective layer 5 is to prevent corrosion in the perpendicular magnetic layer 4 and prevent damage to the surface of the medium when the magnetic head comes in contact with the medium, and commonly known materials may be used therefor. For example, materials that contain C, $SiO_2$, and $ZrO_2$ may be used. The preferred thickness of the protective layer 5 is 1 to 10 nm in terms of high density recording because the distance between the head and the medium can be made small.

For the lubricating layer 6, for example, a lubricating agent such as perfluoropolyether, fluorinated alcohol, and fluorinated carboxylic acid may be preferably used.

In the present invention, it is preferable that the magnetic layer on the non-magnetic substrate 1 side be provided as a magnetic layer of a granular structure, and the magnetic layer on the protective layer 5 side be provided as a magnetic layer of a non-granular structure that does not contain oxide. With such a configuration, it becomes possible to more easily control and adjust the respective characteristics of the magnetic recording medium such as thermal fluctuation characteristic, recording characteristic (OW), and S/N ratio.

Moreover, in the present invention, it is also possible to configure the perpendicular magnetic layer 4 with four or more magnetic layers. For example, there may be provided a configuration such that in addition to the magnetic layers 4a and 4b, the magnetic layer of a granular structure is configured with three layers and the magnetic layer 4c that does not contain oxides is provided thereon, and moreover, the magnetic layer 4c that does not contain oxides is provided as a two-layer structure on the magnetic layers 4a and 4b.

Furthermore, in the present invention, it is preferable that a non-magnetic layer 7 (shown with reference symbols 7a and 7b in FIG. 5) be provided between the three or more layers of magnetic layers that constitute the perpendicular magnetic layer 4. By providing the non-magnetic layer 7 with an appropriate thickness, magnetization reversal of individual films becomes easy, and dispersion of magnetization reversal of the entire magnetic grains can be made small. As a result, it is possible to further improve the S/N ratio.

As the non-magnetic layer 7 to be provided between the magnetic layers that constitute the perpendicular magnetic layer 4, use of a material having an hcp structure is preferred. Specifically, for example, Ru, Ru alloy, CoCr alloy, CoCrX1 alloy (where X1 represents at least one or more types of elements selected from Pt, Ta, Zr, Re, Ru, Cu, Nb, Ni, Mn, Ge, Si, O, N, W, Mo, Ti, V, Zr, and B) and the like may be suitably used.

In a case of using a CoCr based alloy as the non-magnetic layer 7 to be provided between the magnetic layers that constitute the perpendicular magnetic layer 4, the amount of the Co content is preferably in a range from 30 to 80 at %. If the Co content is within this range, the coupling between the magnetic layers can be adjusted to be small.

Moreover, as the non-magnetic layer 7 to be provided between the magnetic layers that constitute the perpendicular magnetic layer 4, as an alloy having an hcp structure, other than Ru, an alloy of Ru, Re, Ti, Y, Hf, Zn and the like may also be used.

Furthermore, as the non-magnetic layer 7 to be provided between the magnetic layers that constitute the perpendicular magnetic layer 4, a metallic material or alloy having other structures may also be used as long as it does not degrade the crystallinity and orientation of the magnetic layers thereabove and thereunder. Specifically, for example, Pd, Pt, Cu, Ag, Au, Ir, Mo, W, Ta, Nb, V, Bi, Sn, Si, Al, C, B, and Cr, or an alloy thereof may be used. In particular, as a Cr alloy, CrX2 (where X2 represents at least one or more types of elements selected from Ti, W, Mo, Nb, Ta, Si, Al, B, C, and Zr) may be suitably used. The preferred amount of the Cr content in this case is not more than 60 at %.

Moreover, as the non-magnetic layer 7 to be provided between the magnetic layers that constitute the perpendicular magnetic layer 4, there is preferably used one having a structure in which the metallic grains of the above alloy are dispersed in an oxide, metallic nitride, or metallic carbide. Furthermore, it is more preferable that these metallic grains have a column-shaped structure that vertically passes through the non-magnetic layer 7. In order to have such structure, it is preferable to use an alloy material that contains an oxide, metallic nitride, or metallic carbide. Specific examples of the oxide that may be used include $SiO_2$, $Al_2O_3$, $Ta_2O_5$, $Cr_2O_3$, MgO, $Y_2O_3$, $TiO_2$ and the like, specific examples of the metallic nitride that may be used include AlN, $Si_3N_4$, TaN, CrN and the like, and specific examples of the metallic carbide that may be used include TaC, Bc, SiC and the like. Furthermore, for example, CoCr—$SiO_2$, CoCr—$TiO_2$, CoCr—$Cr_2O_3$, CoCrPt—$Ta_2O_5$, Ru—$SiO_2$, Ru—$Si_3N_4$, Pd—TaC and the like may be used.

The amount of the content of the oxide, metallic nitride, or metallic carbide in the non-magnetic layer 7 to be provided between the magnetic layers that constitute the perpendicular magnetic layer 4 is preferably an amount of content that does not degrade the crystal growth and crystal orientation of the perpendicular magnetic film. Moreover, the amount of content of the oxide, metallic nitride, or metallic carbide with respect to the alloy is preferably not less than 4 mol % and not greater than 30 mol %.

An amount of the content of the oxide, metallic nitride, or metallic carbide in this non-magnetic layer 7 exceeding the above range is not preferable, because: the oxide, metallic nitride or metallic carbide remains in the metallic grains and degrades the crystallinity and orientation of the metallic grains; the oxide, metallic nitride, or metallic carbide also gets deposited above and under the metallic grains; it becomes difficult for the metallic grains to form a column-shaped structure that vertically passes through the non-magnetic layer 7; and consequently the crystallinity and orientation of the magnetic layer formed on this non-magnetic layer 7 may be degraded in some cases. Meanwhile, if the amount of the oxide, metallic nitride, or metallic carbide contained in this non-magnetic layer 7 is under the above range, it is not preferable because there cannot be obtained the effect associated with the addition of the oxide, metallic nitride, or metallic carbide.

Figure 7:
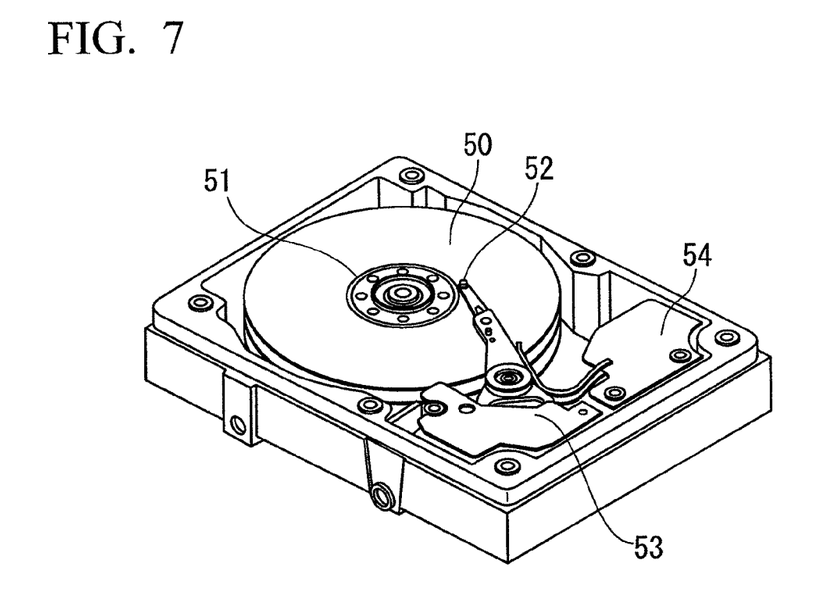
FIG. 7 is a perspective view showing an example of a magnetic recording/reproducing apparatus.

FIG. 7 shows an example of a magnetic recording/reproducing apparatus to which the present invention is applied.

This magnetic recording/reproducing apparatus is provided with: a magnetic recording medium 50 having a configuration shown in FIG. 5; a medium driving section 51 that rotation-drives the magnetic recording medium 50; a magnetic head 52 that records and reproduces information on and from the magnetic recording medium 50; a head driving section 53 that moves this magnetic head 52 relatively to the magnetic recording medium 50; and a recording/reproducing signal processing system 54. Moreover, the recording/reproducing signal processing system 54 is capable of processing externally inputted data and transmitting them to the magnetic head 52, and processing reproducing signals from the magnetic head 52 and transmitting the data to the outside of the apparatus. Furthermore, for the magnetic head 52 used in the magnetic recording/reproducing apparatus to which the present invention is applied, there may be used a magnetic head suitable for higher density recording having a GMR device that utilizes a giant magnetoresistive head (GMR) as a reproducing device.

WORKING EXAMPLES

Hereunder, the effects of the present invention are further clarified, with reference to working examples. The present invention is not limited by the following working examples, and may be carried out with appropriate modifications without departing from the gist of the invention.

Working Example 1

In Working Example 1, first, a cleaned glass substrate (product of Konica Minolta, outer dimension 2.5 inch) was held on a carrier having a substrate holder with the structure shown in FIG. 3 attached thereon, was housed in the film forming chamber of a DC magnetron sputtering apparatus (C-3040, product of Anelva), then the film forming chamber was exhausted until the ultimate vacuum reached $1 \times 10^{-5}$ Pa, and then an adhesive layer with a layer thickness 10 nm was formed on this glass substrate using a Cr target. Moreover, a soft magnetic layer with a layer thickness 25 nm was formed on this adhesive layer at a substrate temperature not greater than 100° C. with use of a target of Co-20Fe-5Zr-5Ta {Fe content 20 at %, Zr content 5 at %, Ta content 5 at %, and remnant Co}, then an Ru layer with a layer thickness 0.7 nm was formed thereon, and then a soft magnetic layer of Co-20Fe-5Zr-5Ta with a layer thickness 25 nm was further formed thereon, thereby providing a soft magnetic base layer.

Figure 8:
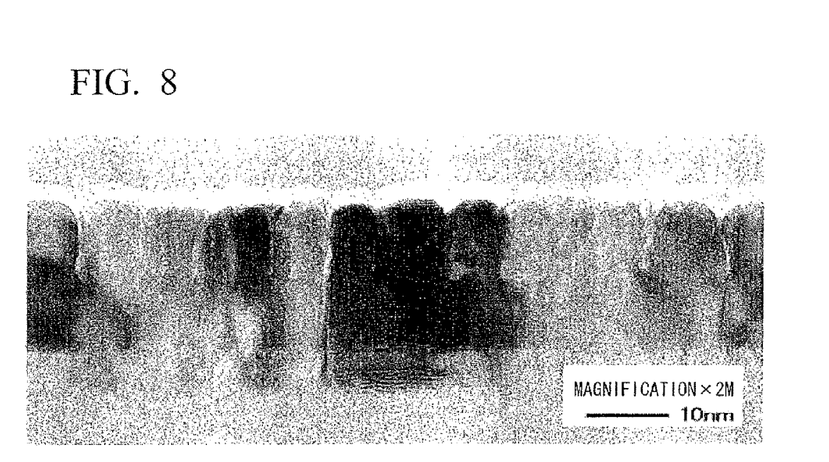
FIG. 8 is a cross-sectional TEM photograph of an orientation control layer formed in Working Example 1.

Subsequently, the glass substrate was transferred to a carrier with a cooling substrate holder having a structure shown in FIG. 4 (b) attached thereon. This cooling substrate holder was cooled to approximately -190° C. using liquid nitrogen. Having held the substrate on this cooling substrate holder for approximately 10 seconds, the substrate was returned again to the substrate holder having the structure shown in FIG. 3, and then after approximately 5 seconds, layers were sequentially formed respectively with a layer thickness 5 nm and 20 nm using an Ni-6W {W content 6 at %, and remnant Ni} target and Ru target, thereby providing an orientation control layer. The substrate temperature at the time of forming the orientation control layer was estimated, by a sensor attached on the substrate holder, to be approximately -10° C. Moreover, the Ru layer was formed with a layer thickness 10 nm at a sputtering pressure 0.8 Pa, and then was formed with a layer thickness 10 nm at a sputtering pressure 1.5 Pa. FIG. 8 shows a cross-sectional TEM photograph of the orientation control layer formed in the manner described above.

Next, on the orientation control layer, there was formed at a sputtering pressure 2 Pa a magnetic layer with a layer thickness 9 nm having a composition (Co15Cr16Pt)91-$(SiO_2)$6-$(TiO_2)$3 {91 mol % of alloy having Cr content 15 at %, Pt content 18 at %, and remnant Co, 6 mol % of an oxide composed of $SiO_2$, 3 mol % of an oxide composed of $Cr_2O_3$, and 3 mol % of an oxide composed of $TiO_2$}.

Next, on the magnetic layer, there was formed a non-magnetic layer with a layer thickness 0.3 nm composed of (Co30Cr)88-$(TiO_2)$12.

Subsequently, on the non-magnetic layer, there was formed at a sputtering pressure 2 Pa, a magnetic layer with a layer thickness 6 nm composed of (Co11Cr18Pt)92-$(SiO_2)$5-(TiO2)3.

Next, on the magnetic layer, there was formed a non-magnetic layer with a layer thickness 0.3 nm composed of Ru.

Next, on the non-magnetic layer, there was formed at a sputtering pressure 0.6 Pa, a magnetic layer with a layer thickness 7 nm, using a target composed of Co20Cr14Pt3B {Cr content 20 at %, Pt content 14 at %, B content 3 at %, and remnant Co}.

Next, a protective layer with a layer thickness 3.0 nm was formed by means of a CVD method, and subsequently, a lubricating layer composed of perfluoropolyether was formed by means of a dipping method, thereby manufacturing the magnetic recording medium of Working Example 1. When the size of the magnetic grains of the manufactured magnetic recording medium was observed on a surface TEM, it was approximately 5 nm.

Then, the recording/reproducing characteristics, that is, S/N ratio, recording characteristic (OW), and thermal fluctuation characteristic of the magnetic recording medium of this Working Example 1 were evaluated with use of a read/write analyzer RWA1632 and a spin stand S1701MP (products of GUZIK, USA). As for the magnetic head, a single pole magnetic pole was used for the writing side, and a head that uses a TMR device was used for the reading side.

As for the S/N ratio, the measurements were conducted at a recording density 750 kFCI.

Meanwhile, as for the recording characteristic (OW), first, a signal of 750 kFCI was written, then a signal of 100 kFCI was overwritten, then a high frequency component was extracted using a frequency filer, and the data writing ability was evaluated based on the remaining ratio thereof.

On the other hand, as for the thermal fluctuation characteristic, having performed writing at a recording density 50 kFCI under a condition of 70° C., the attenuation rate of the output with respect to the reproduction output at one second after the writing was calculated based on (So−S)×100/(So). In this formula, So represents a reproduction output at the point of time one second after the writing, and S represents the reproduction output at 10,000 seconds after the writing.

As a result, the recording/reproducing characteristics of the magnetic recording medium obtained in Working Example 1 were such that S/N ratio was 18.1 dB, OW was 37.6 dB, and thermal fluctuation was 0.3%.

Comparative Example 1

Figure 9:
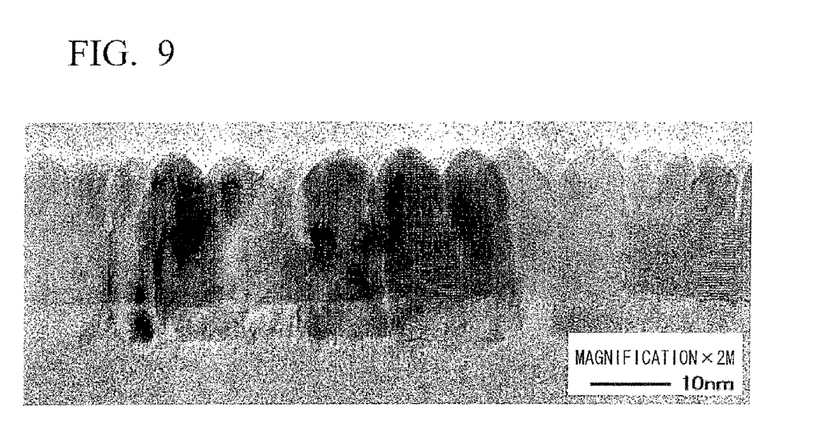
FIG. 9 is a cross-sectional TEM photograph of an orientation control layer formed in Comparative Example 1.

In Comparative Example 1, a magnetic recording medium was manufactured under the conditions similar to those in Working Example 1 except that the substrate was not cooled before forming the orientation control layer. The substrate temperature at the time of forming the orientation control layer was estimated, by a sensor attached on the substrate holder, to be approximately 150° C. Moreover, FIG. 9 shows a cross-sectional TEM photograph of the formed orientation control layer. Furthermore, when the size of the magnetic grains of the manufactured magnetic recording medium was observed on a surface TEM, it was approximately 8 nm.

The recording/reproducing characteristics of the magnetic recording medium obtained in Comparative Example 1 were measured in a way similar to that in Working Example 1, and were such that S/N ratio was 17.6 dB, OW was 37.1 dB, and thermal fluctuation was 0.4%.

Moreover, the scratch resistance of the magnetic recording mediums of Working Example 1 and Comparative Example 1 were evaluated. Specifically, with use of a SAF tester (product of Kubota Comps) and an optical surface analyzer (OSA) (product of Candela), the head was loaded using the tester and held for 2,000 seconds under measurement conditions including disk rotation speed 5,000 rpm, air pressure 100 Torr, and temperature at room temperature, and then the number of scratches was counted using the OSA.

As a result, the scratch count of the OSA on the magnetic recording medium of Working Example 1 was 210, and the scratch count of the OSA on the magnetic recording medium of Comparative Example 1 was 1,200, revealing that the magnetic recording medium of Working Example 1 had a higher level of scratch resistance.

[Description Of Reference Symbols]

1: Non-magnetic substrate, 2: Soft magnetic base layer, 3: Orientation control layer, 4: Perpendicular magnetic layer, 4a: Lower magnetic layer, 4b: Intermediate magnetic layer, 4c: Upper magnetic layer, 5: Protective layer, 6: Lubricating layer, 7: Non-magnetic layer, 7a: Lower non-magnetic layer, 7b: Upper non-magnetic layer, 8: Non-magnetic base layer, 11: Orientation control layer, 11a: Convexo-concave surface, 12 to 14, 20: Magnetic layer or non-magnetic layer, 20a: Convex section, S, S1 to S3: Column-shaped crystal, 23: First film forming substrate, 24: Second film forming substrate, 25: Carrier, 26: Supporting base, 27: Substrate holder, 27A, 27B Cooling substrate holder, 28: Plate body, 29: Through hole, 30: Supporting member, 41: Oxide, 42: Magnetic grains (non-magnetic grains in layer 7a and 7b), 50: Magnetic recording medium, 51: Medium driving section, 52: Magnetic head, 53: Head driving section, 54: Recording/reproducing signal processing system, 80: Substrate, 80a: Opening section

The invention claimed is:

1. A manufacturing method of a magnetic recording medium prepared such that at least on a non-magnetic substrate, there are laminated a soft magnetic base layer, an orientation control layer that controls the orientation of the layer immediately thereabove, and a perpendicular magnetic layer with the magnetization easy axis thereof primarily orientated perpendicular to said non-magnetic substrate, wherein when configuring said perpendicular magnetic layer with two or more magnetic layers, and crystal-growing each layer so that the crystal grains that constitute each of the magnetic layers, together with the crystal grains that constitute said orientation control layer, form column-shaped crystals in a consecutive manner in a thickness direction, lamination of said orientation control layer is conducted while said substrate is being cooled or immediately after said substrate has been cooled, and wherein on a convexo-concave surface where an apex section of each of column-shaped crystals that constitute said orientation control layer is of a convex shape, a height from a top-most apex section of each of said column-shaped crystals to a level where a clearance with an adjacent column-shaped crystal is none, is not greater than an outer-most diameter of each of the column-shaped crystals.

2. A manufacturing method of a magnetic recording medium according to claim 1, wherein a non-magnetic layer is arranged between said orientation control layer and said perpendicular magnetic layer, or having configured said perpendicular magnetic layer with two or more magnetic layers, a non-magnetic layer is arranged between these magnetic layers, and when crystal-growing each layer so that the crystal grains that constitute said magnetic layer and said non-magnetic layer, together with the crystal grains that constitute said orientation control layer, form column-shaped crystals in a consecutive manner in a thickness direction, lamination of said orientation control layer is conducted while said substrate is being cooled or immediately after said substrate has been cooled.

3. A manufacturing method of a magnetic recording medium according to claim 1, wherein said non-magnetic substrate is fixed on a cooled holder to perform cooling of the non-magnetic substrate.

4. A manufacturing method of a magnetic recording medium according to claim 3, wherein lamination of said orientation control layer is conducted in a state where an opening section provided in a central section of said non-magnetic substrate is fixed on said holder.

5. A manufacturing method of a magnetic recording medium according to claim 1, wherein a grain diameter of the crystal grains that constitute said orientation control layer is not greater than 5 nm.

6. A manufacturing method of a magnetic recording medium according to claim 1, wherein said orientation control layer includes an Ru layer or a layer having Ru serving as its primary component.

7. A manufacturing method of a magnetic recording medium according to claim 1, wherein said magnetic layer or said non-magnetic layer has a granular structure.

* * * * *